No. 750,351. Patented January 26, 1904.

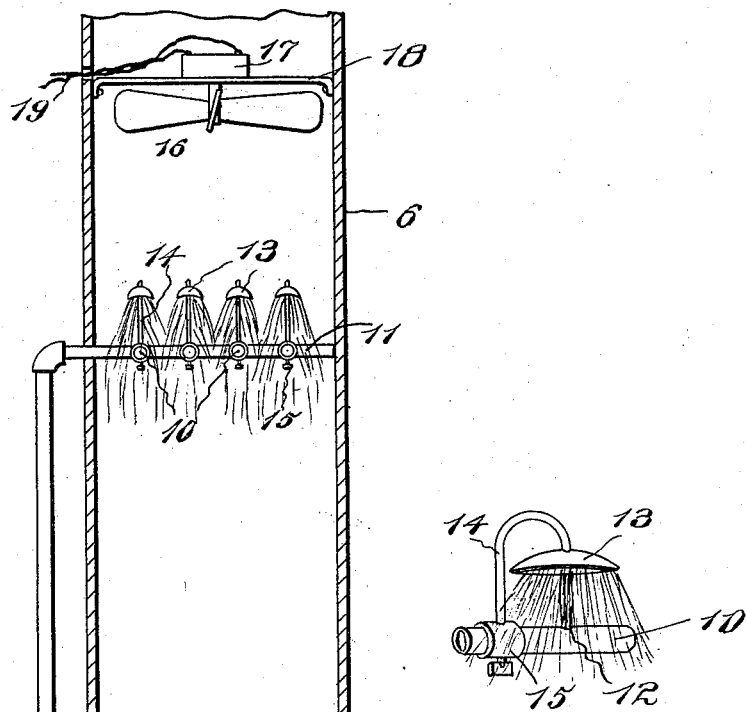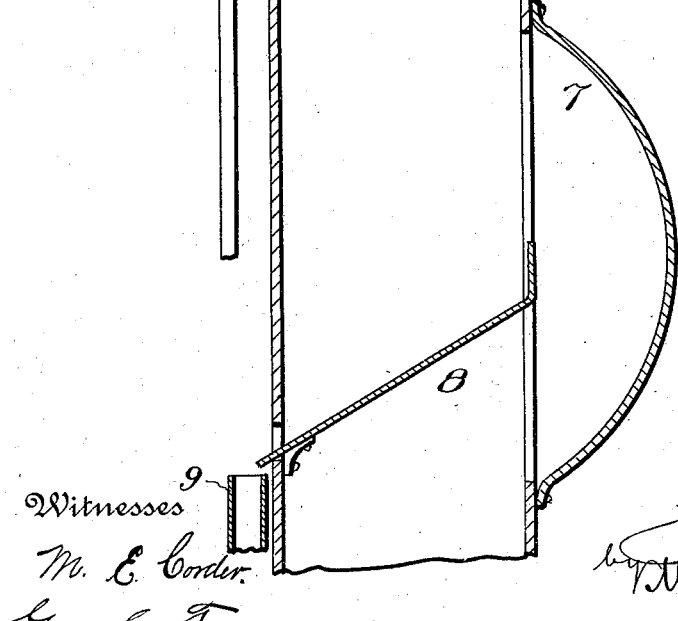

UNITED STATES PATENT OFFICE.

JOHN F. DOYLE, OF CHICAGO, ILLINOIS.

SMOKE-PURIFIER.

SPECIFICATION forming part of Letters Patent No. 750,351, dated January 26, 1904.

Application filed September 19, 1903. Serial No. 173,843. (No model.)

*To all whom it may concern:*

Be it known that I, JOHN F. DOYLE, a citizen of the United States, residing at Chicago, in the county of Cook and State of Illinois, have invented certain new and useful Improvements in Smoke-Purifiers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates particularly to a device for washing the soot, sparks, and dirt from smoke to avoid the discharge of the former into the air and the many objections incident thereto.

It comprises a spray apparatus located in the stack, so that the smoke from the furnace passes through the falling water, the draft being assisted by a suction-fan above the jet-pipes.

The device is illustrated in the accompanying drawings, in which—

Figure 1 is a vertical section of a stack provided with the invention; and Fig. 2 is a perspective view of a portion of a jet-pipe, showing the spraying device.

Referring specifically to the drawings, 6 indicates the smoke-stack, having an enlargement or offset portion 7, through which the smoke passes around a pan or partition 8, which extends across the normal line of the flue and is inclined to form a trough which catches the falling water and dirt and conveys the same outside the stack to a waste-pipe 9, through which the matter is carried off. Within the stack, at a distance above the trough 8 to give the desired or sufficient fall to the water, is placed a spraying device consisting of the branch pipes 10, proceeding from the main water-pipe 11. Each of these branch pipes has jet-holes 12 in the upper side thereof, and above each hole is a spreader or sprayer 13, consisting of an elongated cupped plate supported by a bracket 14, adjustably attached to the pipe by a clamp 15. The jets of water from the holes strike the concave side of the sprayer and are projected downwardly therefrom in a fine spray, through which the smoke must pass to reach the outlet of the stack. To assist the draft and draw the smoke through the water, a suction-fan 16 is provided, being preferably an electric fan driven by a motor 17, supported in the stack by brackets 18, the current being supplied by wires, (indicated at 19.)

When the apparatus is used, the smoke being drawn through the falling spray is effectively cleansed of the dirt, soot, and sparks therein, which matter drops with the water to the trough 8 and is carried off. The inverted-cup-shaped spreaders 13, operated in the manner indicated, produce a fine and effective spray which reaches all parts of the smoke and thoroughly cleans the same.

The device is applicable to new stacks and to old and brick stacks by the addition of a section containing these devices to the top of the old stack. The utility of some device for purifying smoke and preventing the discharge of soot and dangerous sparks, particularly in cities, is evident. The soluble gases of combustion are also removed by the spray.

What I claim as new, and desire to secure by Letters Patent, is—

The combination with a vertical smoke-stack, of a trough forming a partition across the same, a waste-pipe from the trough, a smoke by-pass extending around the trough, a horizontal water-pipe extending across the stack above the trough and having a series of horizontal laterally-extending branches in the stack, said branches having jet-holes discharging upwardly, and sprayer-plates adjustably clamped on the branches, above the holes.

In testimony whereof I affix my signature in presence of two witnesses.

JOHN F. DOYLE.

Witnesses:
W. J. ROBINSON,
H. G. BATCHELOR.